United States Patent
Zhou et al.

(10) Patent No.: US 12,335,013 B2
(45) Date of Patent: Jun. 17, 2025

(54) ENHANCED UE BEHAVIOR IN PREDICTION AND MANAGEMENT OF BEAM FAILURES

(71) Applicant: QUALCOMM Incorporated, San Diego, CA (US)

(72) Inventors: Shanyu Zhou, San Diego, CA (US); Junyi Li, Fairless Hills, PA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 17/807,357

(22) Filed: Jun. 16, 2022

(65) Prior Publication Data

US 2023/0412234 A1    Dec. 21, 2023

(51) Int. Cl.
*H04B 7/06* (2006.01)
*H04W 76/19* (2018.01)
*H04W 80/02* (2009.01)
*H04W 92/18* (2009.01)

(52) U.S. Cl.
CPC .......... *H04B 7/0695* (2013.01); *H04W 76/19* (2018.02); *H04W 80/02* (2013.01); *H04W 92/18* (2013.01)

(58) Field of Classification Search
CPC ..... H04B 7/0695; H04B 7/088; H04W 76/19; H04W 80/02; H04W 92/18
See application file for complete search history.

(56) References Cited

U.S. PATENT DOCUMENTS

| | | | |
|---|---|---|---|
| 2020/0029384 A1* | 1/2020 | Hong | H04W 36/305 |
| 2021/0045093 A1* | 2/2021 | Rao | H04W 76/14 |
| 2021/0211348 A1* | 7/2021 | Li | H04L 41/0677 |
| 2021/0282143 A1* | 9/2021 | Lee | H04W 52/343 |
| 2022/0124466 A1* | 4/2022 | Ali | H04W 80/04 |
| 2022/0132614 A1* | 4/2022 | Back | H04W 76/19 |
| 2022/0191962 A1* | 6/2022 | Di Girolamo | H04L 5/0053 |
| 2022/0217743 A1* | 7/2022 | Zhou | H04W 28/0278 |
| 2022/0225342 A1* | 7/2022 | Zhao | H04W 72/542 |
| 2022/0346173 A1* | 10/2022 | Park | H04W 76/18 |
| 2022/0361012 A1* | 11/2022 | Park | H04W 24/04 |
| 2022/0399927 A1* | 12/2022 | Tsai | H04B 7/0617 |
| 2023/0085465 A1* | 3/2023 | Lee | H04L 1/1822 370/329 |

(Continued)

*Primary Examiner* — Zhiren Qin
(74) *Attorney, Agent, or Firm* — Arent Fox, LLP

(57) ABSTRACT

Aspects of the present disclosure address beam management enhancement with the assistance of a cooperative relay UE over a sidelink (SL) channel. A UE may include a memory and a processor. The processor may use machine learning and channel condition measurements to predict an upcoming Uu link beam failure (BF). Based on the prediction, the processor may request SL data resources from a base station, wherein the processor may receive an allocated SL channel and a relay UE. When the Uu link fails, the processor can transmit a beam failure recovery (BFR) signal to the base station using the relay UE over the SL channel. The present disclosure overcomes the deficiencies of conventional BFR processes in which the BF forces the UE to perform a contentious RACH procedure, causing time delays and power consumption.

30 Claims, 10 Drawing Sheets

(56) References Cited

U.S. PATENT DOCUMENTS

| | | | |
|---|---|---|---|
| 2023/0106128 A1* | 4/2023 | Lee | H04W 72/569 |
| | | | 370/329 |
| 2023/0129741 A1* | 4/2023 | Ji | H04W 36/00837 |
| | | | 370/329 |
| 2023/0224987 A1* | 7/2023 | Kim | H04W 92/18 |
| | | | 370/315 |
| 2023/0247504 A1* | 8/2023 | Haustein | H04W 76/19 |
| | | | 455/436 |
| 2023/0319937 A1* | 10/2023 | Wang | H04W 76/19 |
| | | | 370/315 |
| 2023/0345317 A1* | 10/2023 | Sarkar | H04W 76/15 |
| 2023/0397081 A1* | 12/2023 | Wang | H04W 76/25 |
| 2024/0196301 A1* | 6/2024 | Back | H04W 40/22 |
| 2024/0291547 A1* | 8/2024 | Matsumura | H04B 7/088 |

* cited by examiner

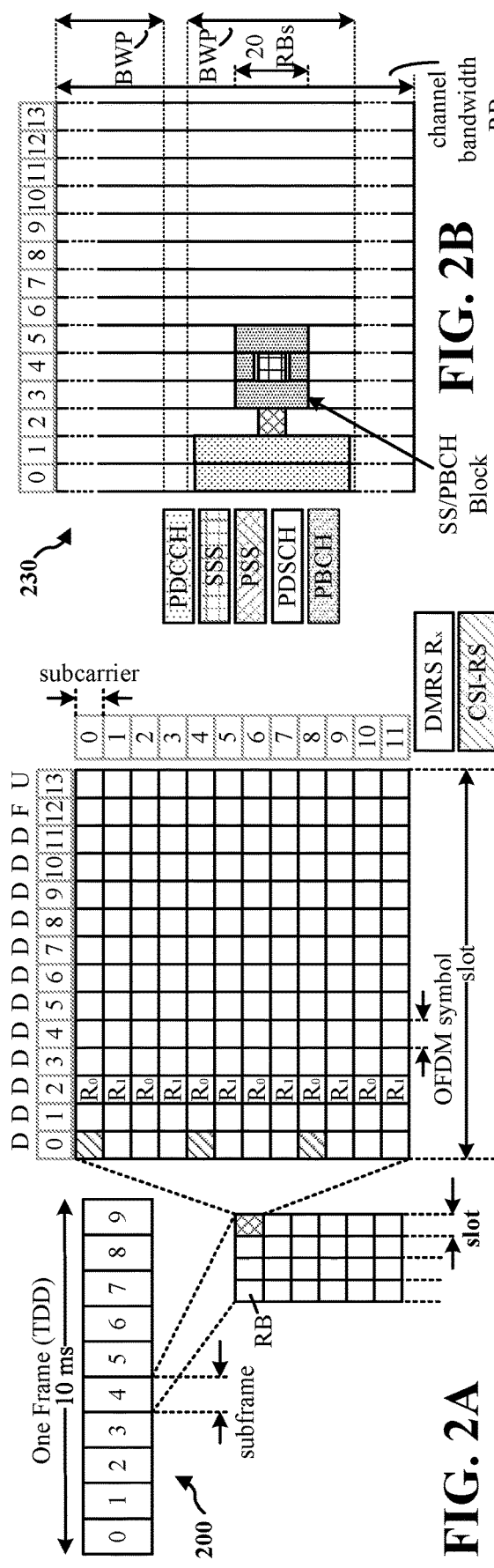
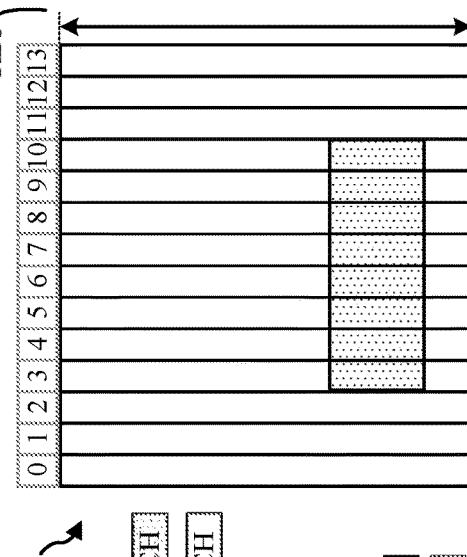
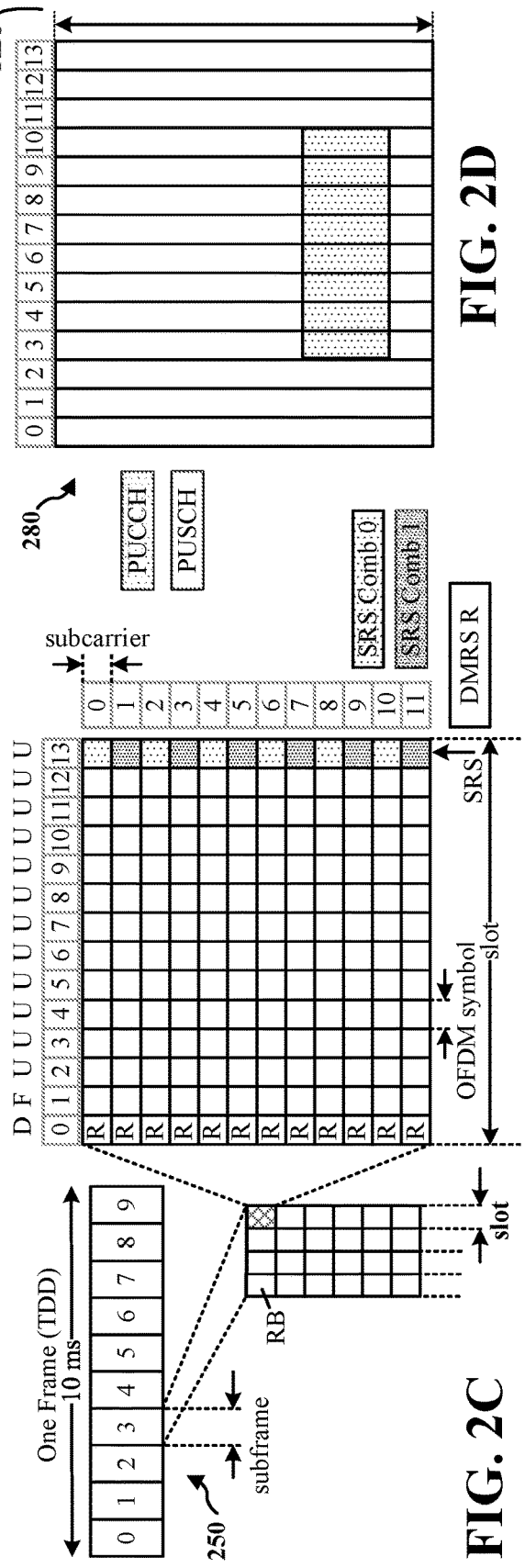
FIG. 2A  FIG. 2B  FIG. 2C  FIG. 2D

ENHANCED UE BEHAVIOR IN PREDICTION AND MANAGEMENT OF BEAM FAILURES

BACKGROUND

Technical Field

The present disclosure generally relates to communication systems, and more particularly, to handling beam failures in network operation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

UEs are increasingly capable of using multi-path communication using two or more spatial beams positioned to facilitate such capability. Some new UE configurations, including in 5G NR may also use a cooperative UE, also known as a relay UE, to enable the UE to exchange configurations with the base station using a sidelink (SL) channel and the relay messages between the UE and the base station. In conventional processes when beam failure (BF) is detected, the UE is relegated to performing a contentious random access channel (RACH). RACHs can be time consuming and stand to quickly drain a UE of power.

Accordingly, to overcome these conventional shortcomings, aspects of the present disclosure use a memory and at least one processor to address beam management enhancement over a sidelink (SL) channel. The processor may use machine learning, channel condition measurements and other techniques to predict an upcoming Uu link beam failure (BF). Based on the prediction, the processor may request SL data resources from a base station, wherein the processor may receive an allocated SL channel and a relay UE. When the Uu link fails, the processor can transmit a beam failure recovery (BFR) signal to the base station using the relay UE over the SL channel. Among other benefits, the present disclosure can use the SL and relay UE to quickly reestablish one or more connections, and thus overcomes the deficiencies of conventional beam failure recovery (BFR) processes in which the BF effectively necessitates that the UE perform a contentious RACH procedure along with the attendant time delays and power consumption before connection can be reestablished.

In one aspect of the disclosure, a method and an apparatus are provided. The apparatus for wireless communication at a user equipment (UE) may include a memory and at least one processor coupled to the memory. The at least one processor may be configured to predict a future Uu link beam failure (BF). The at least one processor may request, based on the prediction, sidelink (SL) data resources from a base station. The at least one processor may receive an allocated SL channel and a relay UE. The at least one processor may transmit, when the Uu link beam fails, a beam failure recovery (BFR) signal to a base station via the relay UE over the SL channel.

In another aspect of the disclosure, a method and an apparatus are provided. The apparatus for wireless communication at a user equipment (UE) may include a memory, and at least one processor coupled to the memory. The at least one processor may be configured to predict an upcoming Uu link beam failure (BF). The at least one processor may further sense a sidelink (SL) channel quality in preparation for transmitting a beam failure recovery (BFR) medium access control/control element (MAC CE) over the SL channel via a relay UE. In response, the at least one processor may transmit the BFR MAC CE over the SL channel via the relay UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
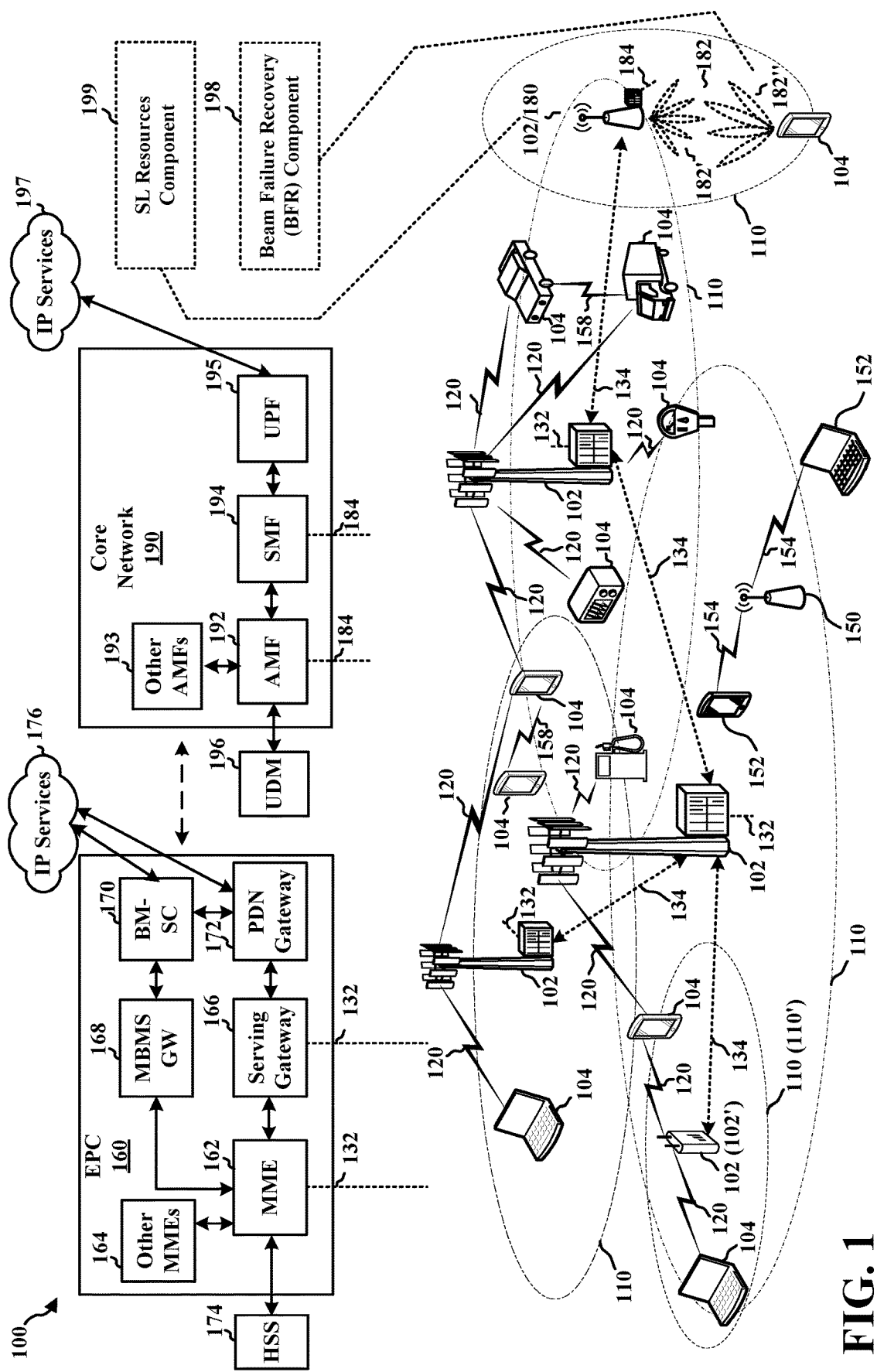
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 180 may be configured to allocate one or more sidelink (SL) resources, including a SL channel (198) to a requesting UE. Further, in certain aspects, the UE 104, which includes beams 182" and is coupled to Beam Failure Recovery (BFR) Component 198, may be configured to predict a future beam failure (BF), via a sensing procedure or an algorithm provided by the UE or configured by base station 180. Based on an allocation by the base station 180 to the UE 104 of the requested resources, the UE may thereupon prepare the SL for a Beam Failure Recovery Medium Access Control/Control Element (BFR MAC CE) such that when the BF in fact occurs, the UE can rapidly transmit the BFR MAC CE over the relay link using the relay UE to the base station (e.g., gNB-DU 180).

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
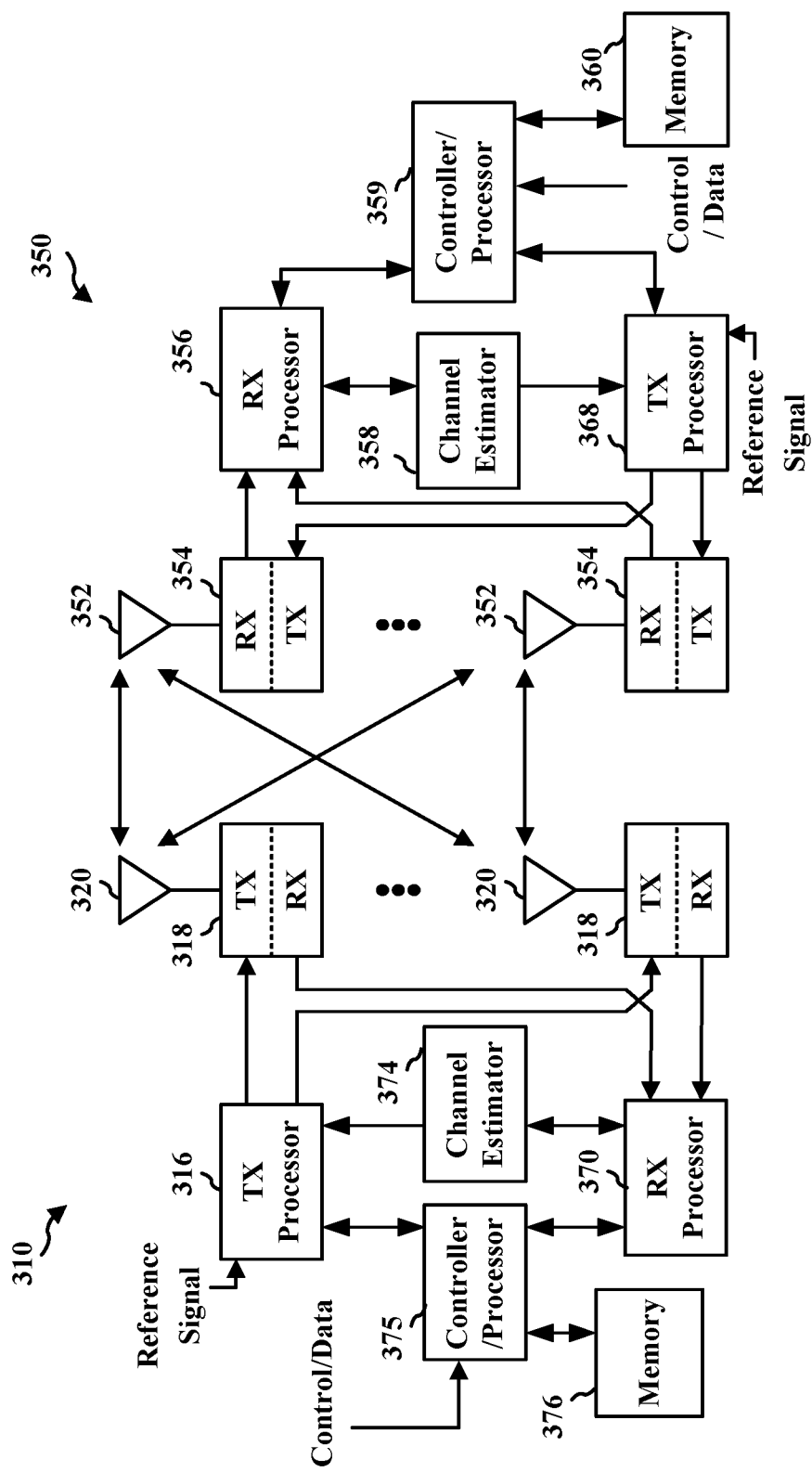
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

The present disclosure concerns addressing BFs in environments such as enhanced multi-path communication with UE cooperation, enhanced layer two single hop UE to relay UE to network operations, and other network configurations involving UE multi-beams in which a beam failure (BF) scenario becomes relevant, and ultimately requires re-acquisition of the network connection. Thus, the present disclosure in concerned with beam management enhancement in a variety of context. One such context may include the assistance of a cooperative UE—known herein as a relay UE—that may be used as a sidelink (SL). Thus, for example, in an example network cell having a base station and a UE, the UE may exchange information directly with the base station over a standard Universal Mobile Telecommunications Service (UNITS) or "Uu" link, which may define a unique connection between a UE and a network via a base station.

In conventional beam failure recovery (BFR) processes, the UE ordinarily performs a RACH procedure as discussed above. A RACH procedure may be defined by a sequence of processes between the UE and base station that ultimately enables the UE to obtain uplink synchronization with the network. RACH procedures may be contention-based, meaning that the RACH may have a plurality of UEs attempting to access it. This in turn may require multiple attempts before a UE can successfully access the network. In general, a window of time exists for a UE to receive a responsive. In case of failure, the UE generally engages in a waiting period before transmitting another RACH request. After the UE successfully receives a response containing information like an RA-preamble identifier that matches the transmitted identifier, then the process can move onto uplink scheduling. In short, every time BFR is necessary, the RACH process consumes potentially significant time and power before network synchronization with the UE is obtained again.

In one aspect of the disclosure, the RACH process is avoided in BFR. Instead, the UE may be connected to a relay UE via an SL channel. In some configurations, the relay UE may be exchanging data with the UE prior to the BF. In other embodiments, the network may configure the relay UE in response to a request as described herein. The utilization of the relay UE may result in enhanced beam management and thereby obviate the need for the use of the RACH. BFR and the relay UE can be used for fast BFR report information, which can be transmitted over the SL channel via the relay UE to the base station. The techniques described herein can improve quality of service (QoS) of serving traffic, can increase network reliability, can reduce overall latency and importantly, can save UE power. This savings of UE power can be especially beneficial in light of the power consumption required for the use of multiple beams.

Figure 4:
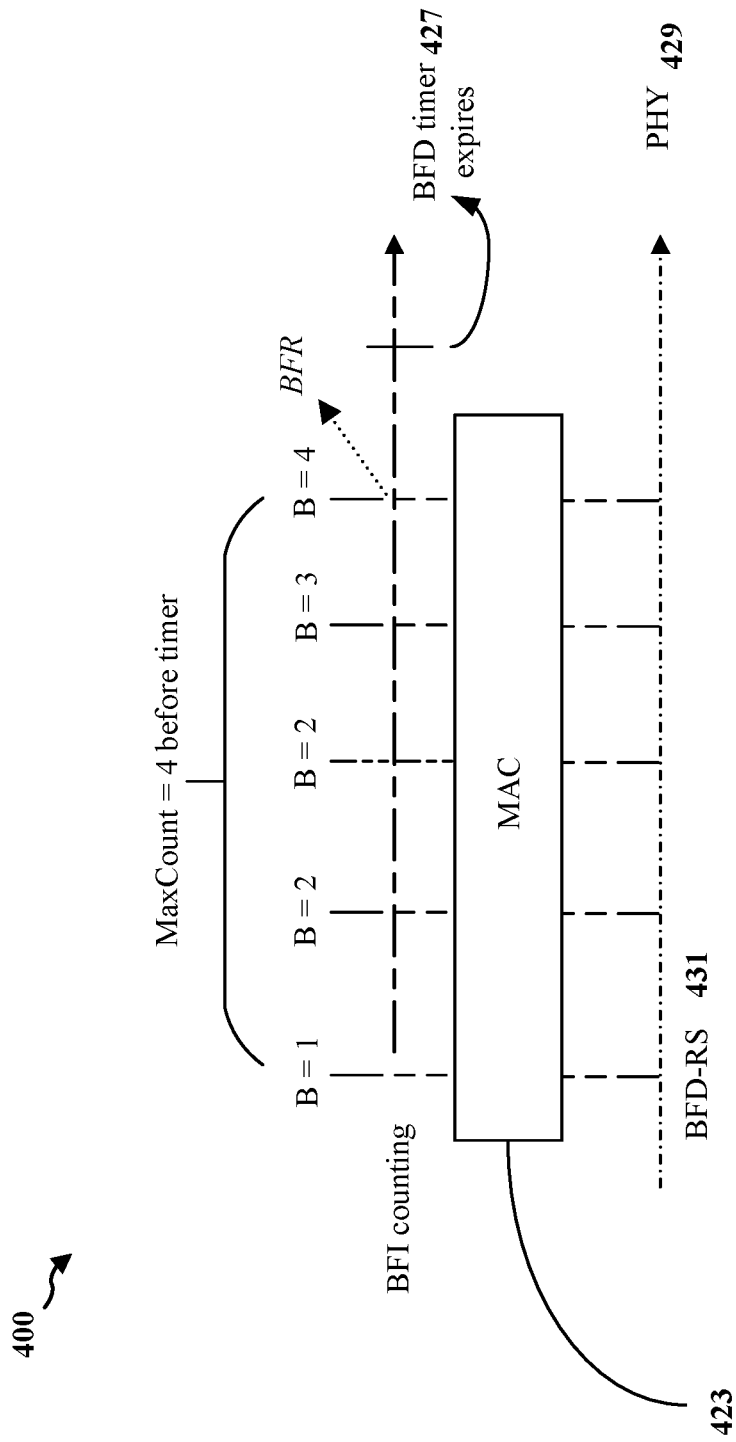
FIG. 4 is a diagram showing a method for a UE to determine whether a beam failure (BF) is present on the channel.

FIG. 4 is a diagram 400 showing a method for a UE to determine whether a beam failure (BF) is present on the channel. FIG. 4 represents an example conventional method of determining a beam failure at a UE. The technique described in FIG. 4 may be conducted at the Media Access Control (MAC) layer 423 or the physical (PHY) layer 429, or some combination thereof. In the technique, a UE using spatial beams on a network may constantly monitor a periodic Beam failure detection reference signal (BFD-RS) at the PHY layer. The BFD-RS may be, for example, a channel state information reference signal (CSI-RS), a synchronization signal block (SSB), or the like.

At the PHY layer, the UE may identify beam failure instance (BFI) indicators. The horizontal axis of the diagram in FIG. 4 may be time. The UE may identify a BFI indicator at every occasion of the BFD-RS 431. Meanwhile, procedures at the PHY layer may estimate a block error rate (BLER). If the BLER meets a threshold, the PHY layer may then issue a BFI indicator (e.g., B=1, B=2, etc.); otherwise if the threshold is not met, no BFI indicator is issued.

At the first indication of a BFI (here, B=1), a BFD timer is started for a given UE. In general, the PHY indicates the BFI to the MAC layer, and the MAC controls the BFD timer and the BFI counting procedure described herein. With the issuance of each BFI indicator, the MAC layer 423 increases the BFI count by 1. If the total BFI counts reaches a MaxCount threshold (e.g., 4 in the example of FIG. 4) prior to expiration of the UE BFD timer, UE declares BF and may proceed to initiate the BFR procedure. Otherwise, if the BFD timer set by the UE expires (427) prior to the total BFI counts reach the MaxCount threshold (e.g., MaxCount=6), the UE does not declare BF, the total BFI count may be reset to 0, and the BFD timer may be reset by the UE at the next identification of a BFI indicator.

Once BFD has occurred, the UE may attempt to recover the beam in the PCell (e.g., gNB) using RACH. In addition to the above-noted shortcomings of this approach, another problem with the procedure outlined in FIG. 4 is that the UE has no prior knowledge as to the status of BFD. That is to say, the UE may determine BF only at the time that the triggering BFI indicator is detected using the BFD-RS 431 prior to expiration of the timer, only then does the UE determine that BF has occurred. Thus only then can the UE begin corrective action. This delay due to the indeterminacy of whether or not the BFI count will meet the MaxCount threshold prior to the timer expiration may add further delay to those that are already imposed by the RACH access procedure. Thus the timing of BFR is further delayed, exacerbating the problem.

Figure 5:
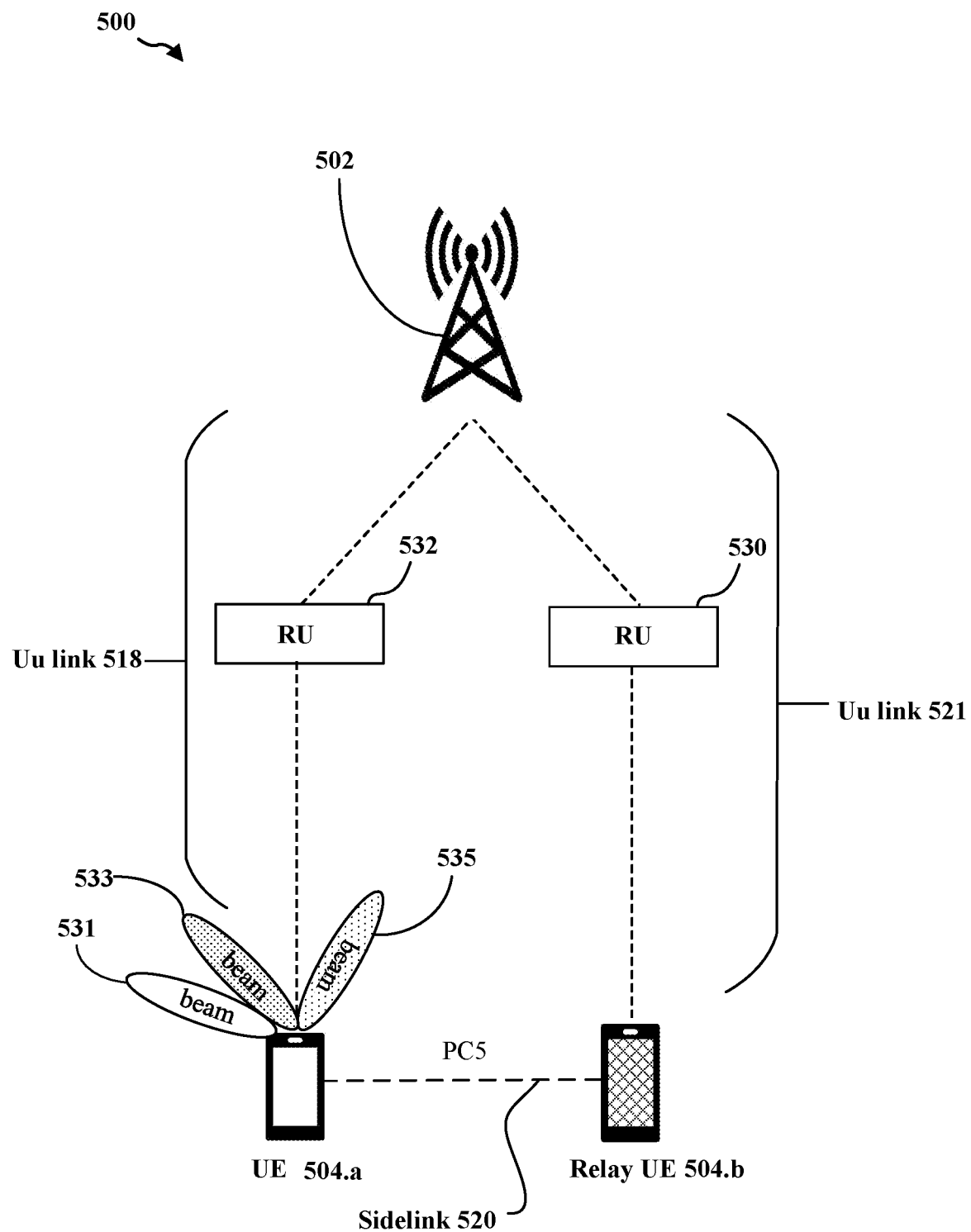
FIG. 5 is a diagram illustrating an example of a UE communicating with a base station over a Uu link and with a relay UE a PC 5 link on a sidelink (SL) channel.

Accordingly, in various aspects of the disclosure, an alternative network configuration is proposed which may eliminate or ameliorate the above-described problems. An exemplary system model through which these aspects can be realized is shown in FIG. FIG. 5 is a diagram 500 illustrating an example of a UE 504.a communicating with a base station 502 over a Uu link 518 including radio unit (RU) 532 and with a relay UE 504.b over a PC 5 link on a sidelink (SL) channel 520. In various configurations, the UE 504.a may exchange data (transmit and receive) with base station 502 using relay 504.b over sidelink 520 and Uu link 521 including RU 530. In some configurations, as described further below, the UE 504.a may not yet be actively connected with relay UE 504.b.

Referring still to FIG. 5, UE 504.a may include beams 531, 533 and 535. UE 504.a may be configured to monitor multiple beams (including the three beams illustrated) for beam condition maintenance and BFR. The UE 504.a and 502 may choose the beam having the best signal quality for communication. As noted, the UE 504.a may also be connected to relay UE 504.b over sidelink 520 through the PC5 interface. In the configuration shown, UE 504.b is coupled to the same gNB 502 as UE 504.a, albeit over a different Uu link 521. As indicated, data communication between the UE 504.a and gNB 502 can be transmitted directly over Uu link 518 and/or relayed via relay 504.b. Thus, in a case where relay UE 504.b has already been configured by gNB 502 to connect in this fashion to UE 504.a, the gNB 502 or the UE 504.a can offload data to Uu link 521 and sidelink 520 if, for example, the relay 504.b is otherwise idle or the Uu link 518 is nearing full capacity. Mode 1 or mode 2 may be used in FIG. 5. That is, the UE configuration may be established by the gNB 502 (mode 1), or by the UE 504.a (mode 2).

Figure 6:
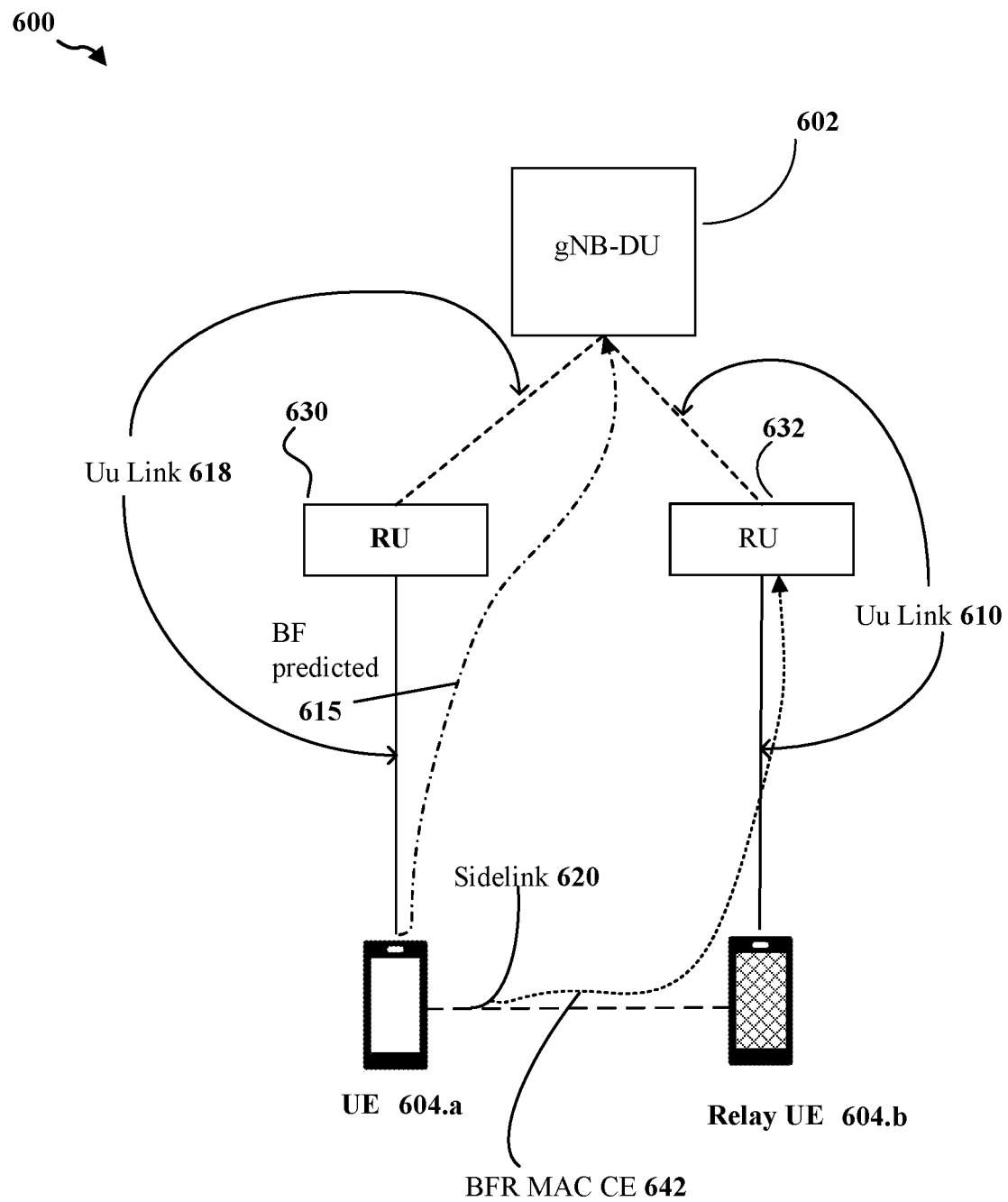
FIG. 6 is a diagram illustrating an example of a UE communicating with a base station over a Uu link and communicating a BFR MAC CE to the base station using a relay UE.

Referring back to the various aspects identified above, FIG. 6 is a diagram 600 illustrating an example of a UE 604.a communicating with a base station (e.g., gNB-DU 602) over a Uu link 618 (including RU 630) and communicating a BFR MAC CE 642 with the same base station using a relay UE 504.b over sidelink 620 and Uu link 610/RU 632. In an initial configuration, UE 604.a may engage in a prediction of a beam failure (BF). The prediction may be based on an algorithm provided by the base station 602 and configured at UE 604.a, or the prediction may be provided directly by UE 604.a. In some arrangements, one or more types of machine learning may be employed to facilitate predicting BFs. Alternatively or in addition, various channel condition measurements may be made during discontinuous reception (DRX ON), including, for example signal-to-interference & noise ratio (SINR), Reference Signal Received Powder (RSRP), path loss, and other indicators of channel quality. BF prediction may also be based on one or more predefined triggering events. Example triggering events may be configured by the gNB, and/or may include conventional BFI counts including a threshold MaxCount. Other predefined triggering events include a consecutive number of recorded BFIs (whether in this interval or in one or more previous intervals), or some more general channel quality-related event (e.g., SINR drops by a predefined number of decibels).

Prediction algorithms and predefined triggering events may be established in a radio resource control (RRC) communications. Multiple values of the above parameters, and other channel-quality based parameters may be simultaneously configured. In some case, the gNB may use a MAC control element (MAC CE) or downlink control information (DCI) to dynamically switch the parameter values, add criteria, etc. that may be used in connection with BF prediction.

With further reference to FIG. 6, it is assumed in this configuration that the sidelink-based relay UE 604.b operates under mode 1 scheduling. In mode 1, the base station (e.g., gNB or eNB) assigns and manages the sidelink radio resources for UE to UE communications using the Uu interface. When the UE 604.a predicts the occurrence of Uu link BF that may occur in the near future as shown in 615, the prediction may involve one or more of the above-identified algorithms and predefined triggering events. A key aspect of this example is that based on this prediction, the UE 604.a advantageously may prepare the SL channel 620 to initiate a BFR MAC CE transmission, such as transmission 642 originating from UE 604.a, over SL channel 620 and via relay UE 604.b over Uu link 610 to gNB 602.

Thus, in various embodiments, the UE may request the gNB for SL data transmission resources using a MAC CE, the BFR MAC CE or uplink control information (UCI). Content in the request may include, for example, (i) one or more reasons for the request, (ii) an expected response deadline for the resources (e.g., if the UE has predicted a time that the BF may occur), (iii) a preferred SL relay UE (e.g., relay UE 604.b if that device is nearby), and/or (iv) one more SL channel measurements (such as channel quality measurements between UE 604.a and the requested relay UE 604.b). In one configuration, if the UE 604.a does not receive a response to the request for resources after some predetermined time period T, then the UE may resend the request. In some arrangements, the UE may be configured to resend up to a certain number N of resource requests.

The response from the gNB 602 may enable UE 604.a to switch beams immediately, for example, to enable subsequent communications to proceed, with a very small lag time, if any, between the initial prediction and the actions that follow.

Figure 7:
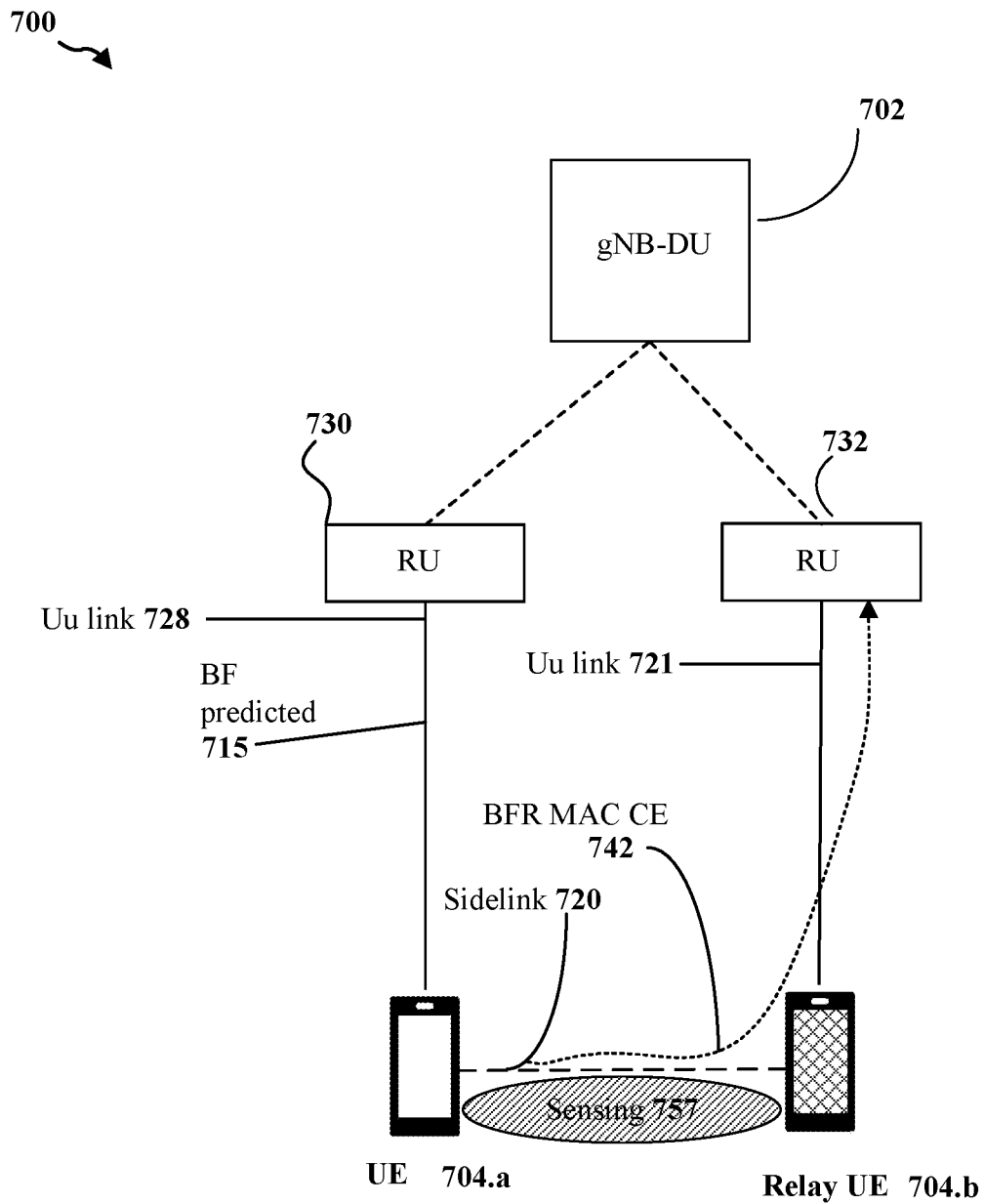
FIG. 7 is a diagram illustrating an example of a UE predicting a beam failure (BF) and requesting SL resources to transmit a beam failure recovery (BFR) signal over the allocated SL channel.

In another aspect of the disclosure, the enhanced UE behavior for beam prediction can be employed in other modes. As an example of one such mode, FIG. 7 is a diagram 700 illustrating an example of a UE 704.a predicting a beam failure (BF) and requesting SL resources to transmit a beam failure recovery (BFR) signal over the allocated SL channel. Unlike in FIG. 6, the scenario of FIG. 7 is in the context of mode 2. In mode 2, the UEs, rather than the base stations, select the SL resources for transmitting and receiving of data. Like in FIG. 6, FIG. 7 includes a UE 704.a communicating with a gNB-DU 702 over Uu link 728 (including RUL 730). FIG. 7 also shows a relay UE 704.b that can exchange data over its own network Uu link 721 (including RU 732) with gNB-DU 702. Relay UE 704.b may be connected to UE 704.a via SL channel 720. In some deployments, relay UE 704.b has not yet connected to UE 704.a.

Initially, the UE 704.a may be communicating in the normal course with gNB 702 over Uu link 728 using an appropriate beam of a set of beams (see, e.g. FIG. 5). Meanwhile, at the PHY layer, the UE may be monitoring one or more parameters in a concerted effort to detect the likelihood of any beam failure. In determining whether to make a prediction, the UE 704.a may use all the resources at its disposal as discussed with respect to other embodiments. These include without limitation prediction algorithms, predefined triggering events, the individual prior experience of the UE 704.a, and others.

Referring still to FIG. 7, a time may come when UE 704.a predicts that a Uu link beam failure is likely to occur in the foreseeable future. At this point, the integrity of the Uu link 728 relative to the UE beam(s) remains stable. Thus while communications over the link 728 may proceed, the UE may initiate SL sensing 757. The nature of the sensing may depend at least in part on whether the UE 704.a is preconfigured with the SL relay UE 704.b over SL channel 720. In this case, the UE 704.a can measure the SL channel quality on the SL channel 720 (e.g., SINR, RSRP, etc.) relative to the preconfigured relay UE 704.b and assuming the quality remains acceptable, the UE may prepare to initiate a BFR MAC CE transmission 742 via the SL channel 720 and Uu link 721 to the gNB-DU 702. The content of the BFR MAC CE 742 may include content described above relative to FIG. 6, or variations thereof. If, by contrast, the UE 705.a is not preconfigured with a SL relay UE, in this case the sensing 757 of the UE 704.a may involve UE 704.a proceeding to measure the SL channel quality and interference characteristics with one or more neighboring UEs. The UE 704.a may thereupon select the best candidate UE based on the measurements. In some configurations, the UE may select a list of the best candidate UEs on the sidelink 720 and prepare a for BFR MC CE transmission 742 via the selected UE to gNB 702. Here again, the BFR MC CE 742 may include the content described above relative to FIG. 6, etc.

Depending on the QoS requirement of the serving traffic on Uu link between the UE and gNB, in some configurations where SL transmission opportunities are deemed important, the UE 704.a may preoccupy the SL channel 720 by transmitting dummy data, such as when UE transmission opportunities are present on the SL 720. When the UE 704.a is free, the UE may proceed to transmit. It will be appreciated by practitioners in the art that this transmission of dummy data, especially if prolonged, may waste SL resources. Accordingly, this function may ideally be configured and overseen by the gNB, in which case the UE may preoccupy the UE 704.a may preoccupy the SL with dummy data to accommodate transmission opportunities as they are available. Such an urgent request by involve URLLC (Ultra Reliable Low Latency Communications traffic), for instance.

Figure 8:
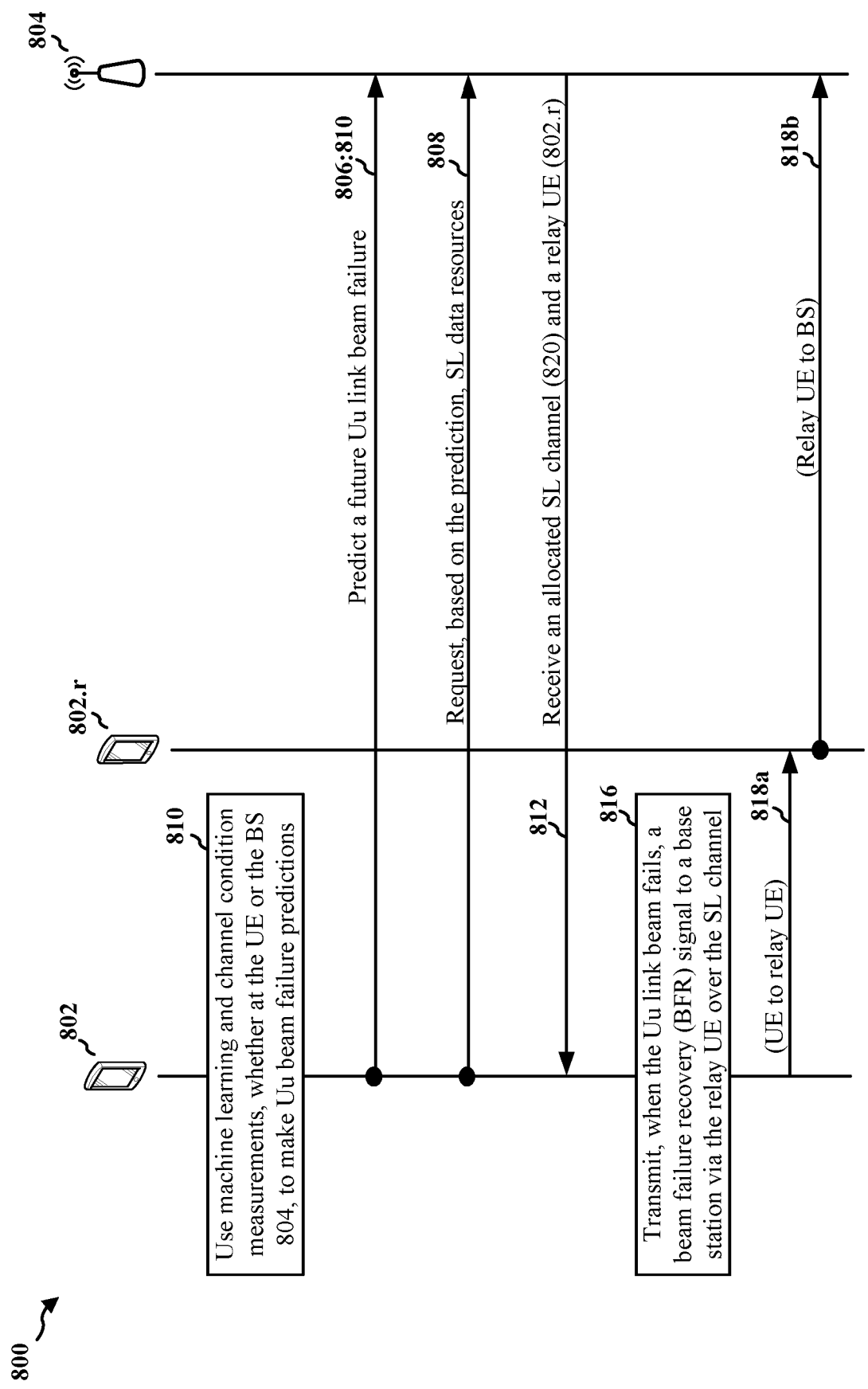
FIG. 8 is a timing diagram illustrating a UE predicting a future Uu link beam failure (BF) and requesting SL data resources for use in transmitting a beam failure recover (BFR) signal to a base station via a relay UE and the SL link.

FIG. 8 is a timing diagram 800 illustrating a UE 802 predicting a future Uu link beam failure (BF) at Uu link 806 and requesting SL data resources 808 for use in transmitting a beam failure recovery (BFR) signal 808 to a base station via a relay UE and the SL link. Referring to UE 802, as before, the UE 802 at box 810 may use one or more machine learning techniques along with channel condition measurements of the SL, whether the measurements are made from the UE 802 or the gNB 804, to predict possible or likely Uu beam failures. In an affirmative case, where a beam failure is likely in the near future, the UE 802 may send its prediction 806 over Uu link 810 to base station 804.

Thereafter, may request SL data resources based on the prediction. The request may be made via link 810, via MAC CE or UCI. Content in the request may include reasons for the request, an expected response deadline for the resources (e.g., if the UE has predicted a time that the BF may occur), a preferred SL relay UE (e.g., relay UE 802.r if that device is nearby), and/or one or more SL channel measurements (such as channel quality measurements between UE 604.a and the requested relay UE 604.b).

At 812, and prior to the beam failure, the gNB 804 may transmit the requested information such as an allocated SL channel (820) and the requested relay UE (802.r). Having received the SL resources, the UE at 816 may transmit, upon failure of the Uu link, a BFR signal to the base station 802 via the relay UE 802—such as a BFR MAC UE from the UE 802 to relay UE 802.r (818a). This BFR MAC UE or other uplink control information is transmitted from relay UE to base station 804 (818b). The base station 804 can thereafter configure the UE 802 with proper beam positioning or switching and can send this response back through the relay UE 802.r. Once the UE corrects the problem and repositions the beam or switches to the proper beam, communications directly to and from UE 802 and base station 804 can resume.

Figure 9:
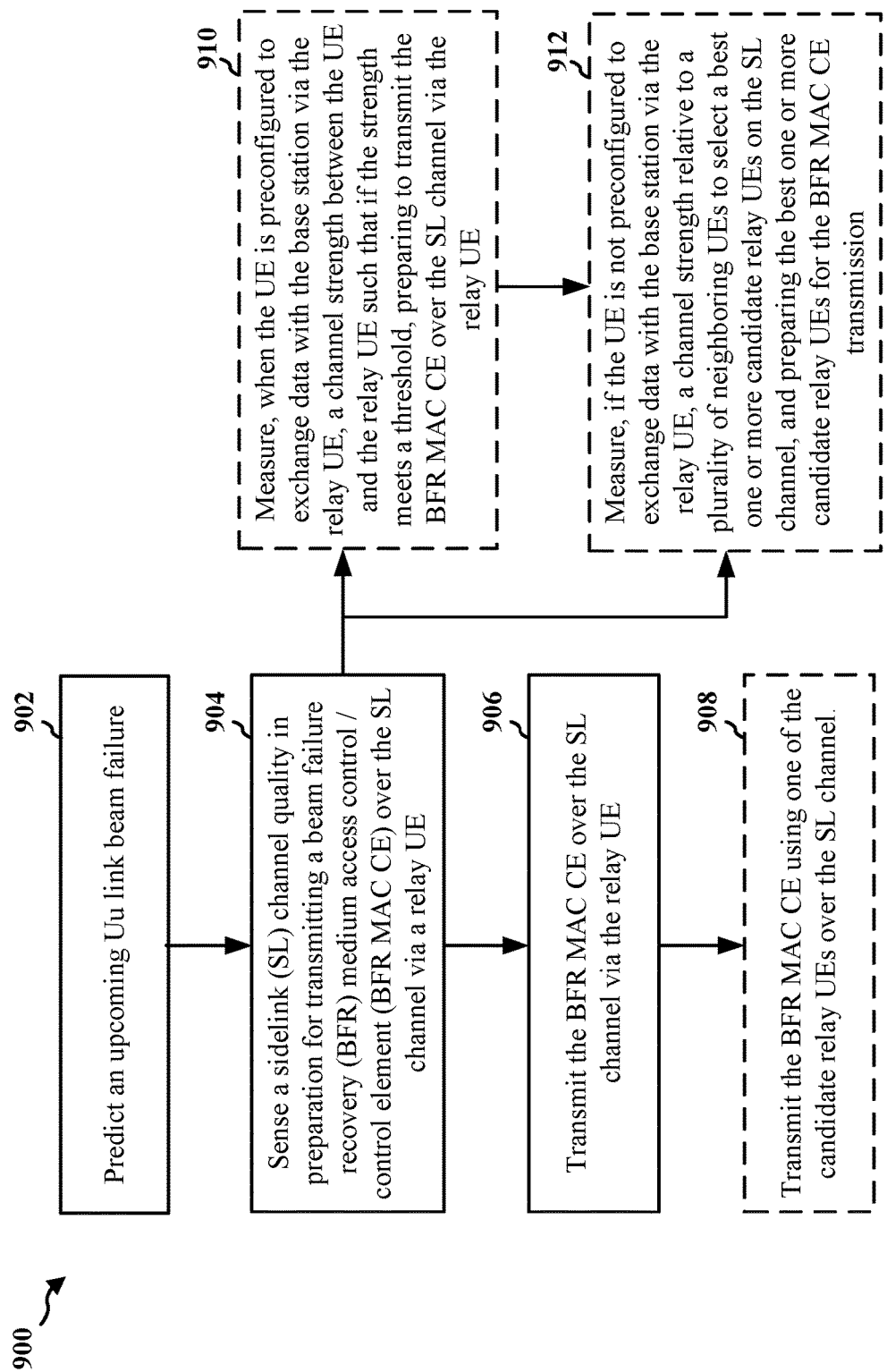
FIG. 9 is a flowchart of a method of wireless communication of a UE.
Figure 10:
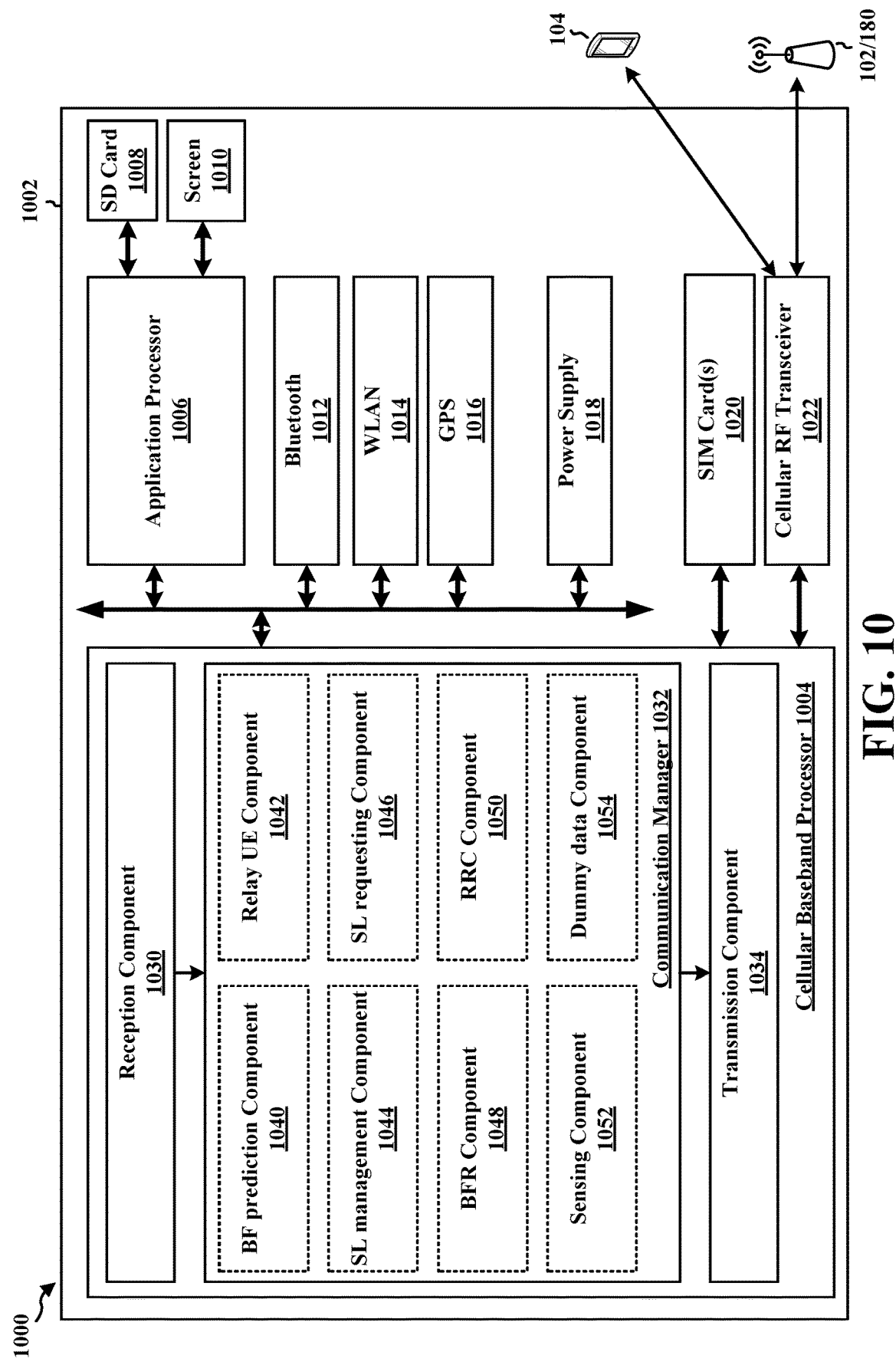
FIG. 10 is a diagram illustrating an example of a hardware implementation for an example apparatus.

FIG. 9 is a flowchart 900 of a method of wireless communication of a UE. The UE that may perform the steps in FIG. 9 may include, for example, any of the UEs 104 in FIG. 1, including the UE coupled to component 198 (i.e., the UE with multiple spatial beams 182"), UE 350 (FIG. 3), UE 504.a (FIG. 5), UE 604.a (FIG. 6), UE 704.a (FIG. 7), UE 802 (FIG. 8), and UE 1002 (FIG. 10). Referring initially to block 902, the UE may predict an upcoming Uu link beam failure coming up. In so doing the UE may use any of the algorithms or triggering events described in this disclosure.

Thereupon, at block 904, the UE may sense a sidelink (SL) channel quality in preparation for transmitting a beam failure recovery (BFR) medium access control/control element (BFR MAC CE) over the SL channel via a relay UE. At block 906, the UE may transmit the BFR MAC CE over the SL channel via the relay UE. The contents of the BFR MAC CE may be as previously described, or it may include additional or fewer pieces of information that is specific to the configuration.

The dashed lines in FIG. 9 represent optional steps. For example, at block 910, the sensing of the SL channel quality in block 904 may include that the UE measures, when the UE is preconfigured to exchange data with the base station via the relay UE, a channel strength between the UE and the relay UE such that if the strength meets a threshold, the UE prepares to transmit the BFR MAC CE over the SL channel via the relay UE. Optionally, the sensing step of block 904 may include that the UE measures, if the UE is not preconfigured to exchange data with the base station via the relay UE, a channel strength relative to a plurality of neighboring UEs to select a best one or more candidate relay UEs on the SL channel, and the UE thus prepares the best one or more candidate relay UEs for the BFR MAC CE transmission.

Further, after transmit step of 906 is complete, the UE may transmit the BFR MAC CE using one of the candidate relay UEs over the SL channel, as in block 908.

FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a component 1040 that is configured to predict a likely occurrence of a beam failure in the near future, e.g., as described in connection with reference numeral 615 of FIG. 6 and reference numeral 806 in FIG. 8

The communication manager 1032 further includes a component 1042 that receives input in the form of data from Component 1050 SL data from Component 1044 and responsive information to SL requesting component 1046 is configured to transmit BFR MAC CE or UCI elements from the UE 1002 to the relay UE and then the base station e.g., as described in connection with steps 642 in FIG. 6, 742 in FIG. 7, 818a in FIG. 8, and 906 in FIG. 9. The communication manager 1032 further includes a component 1044 that receives input in the form of SL information from Component 1050, relay data from Component 1042, the SL identification from Component 1046 and is configured to manage the sidelink between UEs e.g., as described in connection with 620 in FIG. 6, 720 in FIG. 7, 818a in FIG. 8, and 906 in FIG. 9.

The communication manager 1032 further includes a component 1046 that receives input in the form of SL data from Component 1044 and responsive information to SL requesting component 1046 is configured to transmit BFR MAC CE or UCI elements from the UE 1002 to the relay UE and then the base station e.g., as described in connection with steps 642 in FIG. 6, 742 in FIG. 7, 818a in FIG. 8, and 906 in FIG. 9.

The communication manager 1032 further includes a component 1048 that receives input in the form of SL data from Component 1044 and responsive information to SL requesting component 1046 is configured to receive data in the form of predicted beam failures in Component 1040, beam failure recovery data in Component 948, e.g., a described in connection with steps 902 and 906 of FIG. 9. The communication manager 1032 further includes a component 1050 that receives input in the form of BF prediction data from Component 1040, and BF algorithms and predefined triggering events from BFR Component 1048, e.g., a described in connection with steps 902, 904, 910 and 912 of FIG. 9.

The apparatus may include additional components that perform each of the blocks of the algorithm in the aforementioned timing diagram and flowchart of FIGS. 8 and 9. As such, each block in the aforementioned timing diagram and flowchart of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for predicting, means for requesting, means for receiving, means for transmitting, The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is an apparatus for wireless communication at a user equipment (UE), comprising: a memory; and at least one processor coupled to the memory and configured to: predict a future Uu link beam failure (BF); request, based on the prediction, sidelink (SL) data resources from a base station; receive an allocated SL channel and a relay UE; and transmit, when the Uu link beam fails, a beam failure recovery (BFR) signal to a base station via the relay UE over the SL channel.

Example 2 is the apparatus of example 1, wherein the relay UE comprises a relay UE used prior to the BF at least in part by the UE for transmitting data to the base station via the SL.

Example 3 is the apparatus of any of Examples 1 and 2, wherein the relay UE is operating under mode 1 scheduling.

Example 4 is the apparatus of any of Examples 1 to 3, wherein the at least one processor is further configured to predict the future Uu BF using a prediction algorithm provided by the UE, or by the base station via radio resource control (RRC) communications.

Example 5 is the apparatus of any of Examples 1 to 4, wherein during the prediction, the at least one processor is further configured to identify a predefined triggering event provided by the UE or the base station.

Example 6 is the apparatus of any of Examples 1 to 5, wherein the predefined triggering event comprises a beam failure instance (BFI) count meeting a threshold prior to expiration of a timer.

Example 7 is the apparatus of any of Examples 1 to 6, wherein in response to the request for SL data resources, the UE receives an allocation of BFR medium access control/control element (BFE MAC CE) or uplink control information (UCI) for responding to the predicted Uu link beam failure.

Example 8 is the apparatus of any of Examples 1 to 7, wherein the at least one processor is further configured to transmit a BFR signal over the SL channel using the BFR MAC CE or the uplink control information (UCI).

Example 9 is the apparatus of any of Examples 1 to 8, wherein the request for SL data resources includes a reason for the request, an anticipated response deadline of a UE using the SL data resources, a preferred relay node, or an SL measurement Example 10 is the apparatus of any of Examples 1 to 9, wherein the beam failure prediction is configured by the base station, is based on UE autonomy, uses machine learning, or is based on a channel condition measurement.

Example 11 is an apparatus for wireless communication at a user equipment (UE), comprising: a memory; at least one processor coupled to the memory and configured to: predict an upcoming Uu link beam failure (BF); sense a sidelink (SL) channel quality in preparation for transmitting a beam failure recovery (BFR) medium access control/control element (MAC CE) over the SL channel via a relay UE; and transmit the BFR MAC CE over the SL channel via the relay UE.

Example 12 is an apparatus of Example 11, wherein the relay UE is configured to operate under mode 2 scheduling.

Example 13 is an apparatus of any of Examples 11 and 12, wherein the at least one processor is further configured to sense an SL channel quality such that, when the UE is preconfigured to exchange data with the base station via the relay UE over the SL channel, the at least one processor is configured to measure a channel quality between the UE and the relay UE and if the quality meets a threshold, the at least one processor is configured to prepare to transmit the BFR MAC CE over the SL channel via the relay UE.

Example 14 is an apparatus of any of any of Examples 11 to 13, wherein the at least one processor is further configured to measure, when the UE is not preconfigured with the relay UE, a channel quality relative to a plurality of neighboring UEs, to select a best one or more candidate relay UEs on the SL channel, and to prepare the best one or more candidate relay UEs for the BFR MAC CE transmission.

Example 15 is an apparatus of any of Examples 11 to 14, wherein the at least one processor is further configured to transmit the BFR MAC CE using one of the candidate relay UEs over the SL channel.

Example 16 is an apparatus of any of Examples 11 to 15, wherein the at least one processor is configured to transmit dummy data over the SL channel to enable the UE to transmit the BFR MAC CE quickly when necessary.

Example 17 is an apparatus for wireless communication at a user equipment (UE), comprising: predicting means configured to predict a future Uu link beam failure (BF); requesting means configured to request sidelink (SL) data resources from a base station; receiving means configured to receive an allocated SL channel and a relay UE; and transmit means configured to transmit, when the Uu link beam fails, a beam failure recovery (BFR) signal to a base station via the relay UE over the SL channel.

Example 18 is an apparatus of Example 17, wherein the relay UE is used prior to the BF at least in part by the UE for exchanging data with the base station via the SL.

Example 19 is an apparatus of any of Examples 17 and 18, wherein the relay UE is operating under mode 1 scheduling.

Example 20 is an apparatus of any of Examples 17 to 19, wherein the predicting means is further configured to predict the future Uu BF using a prediction algorithm provided by the UE, or by the base station via radio resource control (RRC) communications Example 21 is an apparatus of any of Examples 17 to 20, wherein the predefined triggering event comprises a beam failure instance (BFI) count meeting a threshold prior to expiration of a timer.

Example 22 is an apparatus of any of Examples 17 to 21, wherein in response to the request for SL data resources, the requesting means receives an allocation of BFR medium access control/control element (BFE MAC CE) or uplink control information (UCI) for responding to the predicted Uu link beam failure.

Example 23 is an apparatus of any of Examples 17 to 22, wherein the transmit means is further configured to transmit a BFR signal over the SL channel using the BFR MAC CE or the uplink control information (UCI).

Example 24 is an apparatus of any of Examples 17 to 23, wherein the request for SL data resources includes a reason for the request, an anticipated response deadline of a UE using the SL data resources, a preferred relay node, or an SL measurement.

Example 25 is a method for wireless communication at a user equipment (UE), comprising: predicting an upcoming Uu link beam failure (BF); sensing a sidelink (SL) channel quality in preparation for transmitting a beam failure recovery (BFR) medium access control/control element (MAC CE) over the SL channel via a relay UE; and transmitting the BFR MAC CE over the SL channel via the relay UE.

Example 26 is the method of Example 25, wherein the relay UE is configured to operate under mode 2 scheduling.

Example 27 is the method of any of Examples 25 and 26, wherein sensing an SL channel quality comprises measuring, when the UE is preconfigured to exchange data with the base station via the relay UE, a channel strength between the UE and the relay UE such that if the strength meets a threshold, preparing to transmit the BFR MAC CE over the SL channel via the relay UE.

Example 28 is the method of any of Examples 25 to 27, wherein sensing an SL channel quality comprises measuring, if the UE is not preconfigured to exchange data with the base station via the relay UE, a channel strength relative to a plurality of neighboring UEs to select a best one or more candidate relay UEs on the SL channel, and preparing the best one or more candidate relay UEs for the BFR MAC CE transmission.

Example 29 is the method of any of Examples 25 to 28, further comprising transmitting the BFR MAC CE using one of the candidate relay UEs over the SL channel.

Example 30 is the method of any of Examples 25 to 29, wherein upon receiving base station authorization, the at least one processor is configured to transmit dummy data over the SL channel to enable the UE to transmit the BFR MAC CE quickly when necessary.

What is claimed is:

1. An apparatus for wireless communication at a user equipment (UE), comprising:
a memory; and
at least one processor coupled to the memory and configured to:
predict a future Uu link beam failure (BF);
request, based on the prediction, sidelink (SL) data resources from a base station;
receive an allocated SL channel and a relay UE; and
transmit, when the Uu link beam fails, a beam failure recovery (BFR) signal to a base station via the relay UE over the SL channel.

2. The apparatus of claim 1, wherein the relay UE comprises a relay UE used prior to the BF at least in part by the UE for transmitting data to the base station via the SL.

3. The apparatus of claim 1, wherein the relay UE is operating under mode 1 scheduling.

4. The apparatus of claim 1, wherein the at least one processor is further configured to predict the future Uu BF using a prediction algorithm provided by the UE, or by the base station via radio resource control (RRC) communications.

5. The apparatus of claim 1, wherein during the prediction, the at least one processor is further configured to identify a predefined triggering event provided by the UE or the base station.

6. The apparatus of claim 5, wherein the predefined triggering event comprises a beam failure instance (BFI) count meeting a threshold prior to expiration of a timer.

7. The apparatus of claim 1, wherein in response to the request for SL data resources, the UE receives an allocation of BFR media access control/control element (BFE MAC CE) or uplink control information (UCI) for responding to the predicted Uu link beam failure.

8. The apparatus of claim 7, wherein the at least one processor is further configured to transmit a BFR signal over the SL channel using the BFR MAC CE or the uplink control information (UCI).

9. The apparatus of claim 1, wherein the request for SL data resources includes a reason for the request, an anticipated response deadline of a UE using the SL data resources, a preferred relay node, or an SL measurement.

10. The apparatus of claim 1, wherein the beam failure prediction is configured by the base station, is based on UE autonomy, uses machine learning, or is based on a channel condition measurement.

11. An apparatus for wireless communication at a user equipment (UE), comprising:
a memory;
at least one processor coupled to the memory and configured to:
predict an upcoming Uu link beam failure (BF);
sense a sidelink (SL) channel quality in preparation for transmitting a beam failure recovery (BFR) medium access control/control element (MAC CE) over the SL channel via a relay UE; and transmit the BFR MAC CE over the SL channel via the relay UE.

12. The apparatus of claim 11, wherein the relay UE is configured to operate under mode 2 scheduling.

13. The apparatus of claim 11, wherein the at least one processor is further configured to sense an SL channel quality such that, when the UE is preconfigured to exchange data with the base station via the relay UE over the SL channel, the at least one processor is configured to measure a channel quality between the UE and the relay UE and if the quality meets a threshold, the at least one processor is configured to prepare to transmit the BFR MAC CE over the SL channel via the relay UE.

14. The apparatus of claim 11, wherein the at least one processor is further configured to measure, when the UE is not preconfigured with the relay UE, a channel quality relative to a plurality of neighboring UEs, to select a best one or more candidate relay UEs on the SL channel, and to prepare the best one or more candidate relay UEs for the BFR MAC CE transmission.

15. The apparatus of claim 14, wherein the at least one processor is further configured to transmit the BFR MAC CE using one of the candidate relay UEs over the SL channel.

16. The apparatus of claim 11, wherein the at least one processor is configured to transmit dummy data over the SL channel to enable the UE to transmit the BFR MAC CE quickly when necessary.

17. An apparatus for wireless communication at a user equipment (UE), comprising:
predicting means configured to predict a future Uu link beam failure (BF);
requesting means configured to request, based on the prediction, sidelink (SL) data resources from a base station;
receiving means configured to receive an allocated SL channel and a relay UE; and
transmitting means configured to transmit, when the Uu link beam fails, a beam failure recovery (BFR) signal to a base station via the relay UE over the SL channel.

18. The apparatus of claim 17, wherein the relay UE is used prior to the BF at least in part by the UE for exchanging data with the base station via the SL.

19. The apparatus of claim 17, wherein the relay UE is operating under mode 1 scheduling.

20. The apparatus of claim 17, wherein the predicting means is further configured to predict the future Uu BF using a prediction algorithm provided by the UE, or configured by the base station via radio resource control (RRC) communications.

21. The apparatus of claim 20, wherein the predefined triggering event comprises a beam failure instance (BFI) count meeting a threshold prior to expiration of a timer.

22. The apparatus of claim 17, wherein in response to the request for SL data resources, the requesting means is configured to receive an allocation of BFR medium access control/control element (BFR MAC CE) or uplink control information (UCI) for responding to the predicted Uu link beam failure.

23. The apparatus of claim 22, wherein the transmit means is further configured to transmit a BFR signal over the SL channel using the BFR MAC CE or the uplink control information (UCI).

24. The apparatus of claim 17, wherein the request for SL data resources includes a reason for the request, an anticipated response deadline of a UE using the SL data resources, a preferred relay node, or an SL measurement.

25. A method for wireless communication at a user equipment (UE), comprising:
predicting an upcoming Uu link beam failure (BF);
sensing a sidelink (SL) channel quality in preparation for transmitting a beam failure recovery (BFR) medium access control/control element (MAC CE) over the SL channel via a relay UE; and
transmitting the BFR MAC CE over the SL channel via the relay UE.

26. The method of claim 25, wherein the relay UE is configured to operate under mode 2 scheduling.

27. The method of claim 25, wherein sensing an SL channel quality comprises measuring, when the UE is preconfigured to exchange data with the base station via the relay UE, a channel strength between the UE and the relay UE to determine whether the strength meets a threshold, and transmitting the BFR MAC CE using the SL channel via the relay UE when the threshold is met.

28. The method of claim 25, wherein sensing an SL channel quality comprises measuring, when the UE is not preconfigured to exchange data with the base station via the relay UE, a channel strength relative to a plurality of neighboring UEs to select a best one or more candidate relay UEs on the SL channel, and using the one or more candidate relay UEs to transmit the BFR MAC CE.

29. The method of claim 25, further comprising transmitting the BFR MAC CE using one of the candidate relay UEs over the SL channel.

30. The method of claim 25, wherein upon receiving base station authorization, the at least one processor is configured to transmit dummy data over the SL channel to enable the UE to transmit the BFR MAC CE quickly when necessary.

* * * * *